US012465428B2

(12) United States Patent
Nijhof et al.

(10) Patent No.: US 12,465,428 B2
(45) Date of Patent: Nov. 11, 2025

(54) IMAGE-BASED DEVICE TRACKING (71) Applicant: KONINKLIJKE PHILIPS N.V., Eindhoven (NL)

(72) Inventors: Niels Nijhof, Utrecht (NL); Albert Louw Faber, Eindhoven (NL); Petrus Cornelus Adrianus Vogels, Noord-Brabant (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 490 days.

(21) Appl. No.: 17/297,083

(22) PCT Filed: Nov. 29, 2019

(86) PCT No.: PCT/EP2019/083182
§ 371 (c)(1),
(2) Date: May 26, 2021

(87) PCT Pub. No.: WO2020/109604
PCT Pub. Date: Jun. 4, 2020

(65) Prior Publication Data
US 2022/0022967 A1 Jan. 27, 2022

(30) Foreign Application Priority Data
Nov. 29, 2018 (EP) ..................... 18209238

(51) Int. Cl.
*A61B 34/20* (2016.01)
(52) U.S. Cl.
CPC ...... *A61B 34/20* (2016.02); *A61B 2034/2057* (2016.02); *A61B 2034/2059* (2016.02); *A61B 2034/2065* (2016.02)

(58) Field of Classification Search
None
See application file for complete search history.

(56) References Cited

U.S. PATENT DOCUMENTS

2007/0100223 A1* 5/2007 Liao ..................... G06T 7/30
600/407
2008/0219540 A1* 9/2008 Ter Mors ............... G06T 15/08
382/132
(Continued)

FOREIGN PATENT DOCUMENTS

CN 1973779 A 6/2007
CN 102713976 A 10/2012
(Continued)

OTHER PUBLICATIONS

International Search Report and Written Opinion of PCT/EP2019/083182, dated Feb. 11, 2020.

*Primary Examiner* — Katherine L Fernandez (57) ABSTRACT

The present invention relates to supporting an interventional procedure involving a device, such as a cardiovascular procedure. First and second image data acquired using different imaging apparatus, for example X-ray and ultrasound image data, are co-registered. A device is firstly identified in 2D X-ray images; corresponding identification information is then used to generate a view from 3D ultrasound image data that includes a cross-section of the device to be identified subsequently. Following the identification, a 3D position and orientation of the device are available. Such information may advantageously be used in setting up optimal ultrasound views for image-based guidance of the ongoing procedure.

18 Claims, 4 Drawing Sheets

(56) References Cited

U.S. PATENT DOCUMENTS

| | | | | |
|---|---|---|---|---|
| 2009/0281418 A1* | 11/2009 | Ruijters | ............... | A61B 6/5247 |
| | | | | 382/294 |
| 2011/0137156 A1* | 6/2011 | Razzaque | ............... | A61B 34/20 |
| | | | | 600/424 |
| 2013/0123598 A1* | 5/2013 | Jenkins | ................. | A61B 5/283 |
| | | | | 600/374 |
| 2015/0294454 A1* | 10/2015 | Nempont | ............. | A61B 6/5247 |
| | | | | 382/128 |
| 2015/0302634 A1* | 10/2015 | Florent | ..................... | G06T 7/30 |
| | | | | 345/419 |
| 2017/0202625 A1* | 7/2017 | Bharat | ................... | A61B 34/20 |
| 2020/0046436 A1* | 2/2020 | Tzeisler | ................. | A61B 5/061 |

FOREIGN PATENT DOCUMENTS

| | | |
|---|---|---|
| CN | 104780845 A | 7/2015 |
| CN | 104822323 A | 8/2015 |
| NO | 2011070477 A1 | 6/2011 |
| WO | 2011070492 A1 | 6/2011 |
| WO | 2014087324 A1 | 6/2014 |

\* cited by examiner

IMAGE-BASED DEVICE TRACKING

CROSS-REFERENCE TO PRIOR APPLICATIONS

This application is the U.S. National Phase application under 35 U.S.C. § 371 of International Application No. PCT/EP2019/083182, filed on Nov. 29, 2019, which claims the benefit of European Patent Application No. 18209238.7, filed on Nov. 29, 2018. These applications are hereby incorporated by reference herein.

FIELD OF THE INVENTION

The present invention relates to an apparatus for supporting a medical procedure involving a device, an imaging system comprising such apparatus, a method for tracking a device in medical image data, a computer program product and a computer-readable medium storing such computer program product.

BACKGROUND OF THE INVENTION

Various medical imaging systems are in use to acquire images of anatomical structures, for example of the cardiovascular system. These images may be used to provide a clinician with feedback during a medical procedure, for example during advanced minimally invasive treatments or interventions in an operating room or catheterization laboratory (cathlab).

For certain medical interventions in the cardiac domain, X-ray fluoroscopy and/or ultrasound imaging may be used. For example, ultrasound imaging (or echo imaging) such as 3D TEE or ICE is the modality of choice for many upcoming transcatheter Structural Heart Interventions (SHI). The acquired images are used to visualize both the soft-tissue anatomy as the delivery and treatment devices for patients with Structural Heart Disease (SHD).

However, imaging such devices using ultrasound is often difficult, as the majority of existing interventional and treatment devices are relatively incompatible with ultrasound imaging. In particular, effects such as shadowing, reflection and acoustic artifacts may obscure the device to a certain degree, making it difficult to recognize the device in an ultrasound image. Further, when a device is not completely within the limited field of view (FoV) of ultrasound imaging, the device may be captured only partially, making it difficult to properly interpret the images and get an optimal view for guidance and treatment.

In addition to ultrasound, x-ray fluoroscopy is commonly used to visualize devices in the body when a high spatial and temporal resolution is needed.

SUMMARY OF THE INVENTION

It would be advantageous to provide improved support for guidance and treatment during a medical procedure, in particular involving a device to be identified and tracked in medical images.

To address this, in a first aspect of the invention an apparatus is provided as defined in the independent claim 1; further examples are incorporated in the dependent claims.

Accordingly, an apparatus is provided that comprises an input unit and a processing unit. The input unit is configured to receive first image data and second image data, wherein the first and second image data include at least a portion of said device and wherein the first and second image data had been acquired using different imaging apparatus. The processing unit is configured to establish a co-registration between the first and second image data; identify a device in the first image data; generate an image from the second image data using identification information of the device as identified in the first image data, and further identify the device in the generated image.

Using the generated image, recognition or identification of the device, or a part thereof, in the second image data may be facilitated, in particular for image data in which a device of interest such as a medical instrument or treatment device, by its nature, may have relatively low visibility. For example, the identification in the second image may be assisted by preprocessing the second image data using identification information of the device of interest, as obtained or established by identifying the device in the first image data, in which the device may have higher visibility.

In particular, such preprocessing may involve generating a specific image or view from the second image data, using or incorporating such identification information. An image thus generated may for example include a cross-section of the device and allow for the device to be suitably identified in a relative accurate manner.

As a result, device tracking information including, for example, a 3D location i.e. position and orientation of the device may be established with relatively high accuracy.

In certain examples, such information may be used in setting up optimal ultrasound views for image-based guidance of the ongoing procedure.

The first image data may comprise 2D image data and the second image data may comprise 3D image data.

In a particular example, the 2D image data may be 2D X-ray image data, such as X-ray fluoroscopy images. In general, interventional or treatment devices are opaque to X-ray meaning that a relatively detailed footprint of the device is visible in an X-ray image, albeit in a 2D projection view.

In a further example, the 3D image data may be 3D ultrasound image data. In an example, the processing unit is further configured to derive a plane in 3D space based on the device identification information. Thus, for example, an image plane may be derived, which plane may be known to include a cross-section of the device. When an image is generated from the second image data in this plane, the generated view must likewise include a device cross-section. Thus, a further identification of the device in the generated view may be carried out.

Preferably, a co-registration is established between the first and second image data. Thus, for instance, a co-registration is established between 2D X-ray image data and 3D ultrasound image data.

Accordingly, high-resolution device projection information provided by the X-ray image data may be combined with rough 3D device location and shape information provided by the ultrasound image data. Thus, for example, a 3D position and orientation of the device may be determined as further described herein.

In an example, the co-registration is established using the Philips EchoNavigator tool providing real-time fusion of live X-ray and 3D ultrasound images, as described in the Applicant's prior application WO 2011/070477 A1. Thus, establishing the co-registration may involve detecting an ultrasound probe in a 2D X-ray image and estimating its position and orientation in a reference coordinate system, for example using a 2D-3D registration between the footprint of the detected ultrasound probe and a 3D model of the probe.

Preferably, a device is firstly identified in the first image data. For example, the device is identified in a frame of an X-ray image sequence, such as a sequence of fluoroscopy images obtained in real-time by an interventional X-ray system comprising a C-arm imaging apparatus. For example, the C-arm may have been brought to a position and orientation in which X-ray images are acquired at a projection angle providing a high quality view on the device of interest, with a relatively low amount of foreshortening.

In an example, the identification of a device in the first image data involves a manual identification. Alternatively, an automatic or semi-automatic device identification may be provided. The identification may include a selection, in the first image data, of two points defining the device.

For example, when the selection involves an X-ray image, a point that has thus been selected or annotated, either manually or automatically, can be represented as a projection line in 3D space, corresponding to a ray that originates from the focus point of the X-ray tube and passes through the selected point. If two points are selected, two projection lines will be obtained, which together define a plane in 3D space including the identified device. In this example, the device identification information may include the location or coordinates of the two selected points.

If a co-registration is established between the X-ray image data and 3D ultrasound image data, the derived plane may be used as a basis for generating or rendering an ultrasound image from the ultrasound image data. For example, a 2D cross-section image may be generated, which generated image includes a cross-section of at least a portion of the device within a field of view of the 3D ultrasound image data.

In an example, the identification of a device in the generated image involves a manual identification. Alternatively, an automatic or semi-automatic device identification may be provided. The identification may include a selection, in the generated image, of two further points defining the device.

In a further example, the selection of the further points is constrained or restricted so that the further points lay on epipolar lines in the generated image. The epipolar lines on the generated image may correspond to epipolar lines defined by the X-ray geometry; in other words, the projection lines obtained with the selection of the device points in the X-ray image.

Thus, the identification of the device in the generated image may be facilitated, as for example in an image generated from ultrasound image data a tip or end point of a device may be difficult to determine with sufficient accuracy. By setting a boundary condition that the point lays on an epipolar line, the search region or search space for such point may be restricted and thus point selection may be simplified.

In an example, the processing unit is further configured to generate device tracking information including a 3D position and orientation of the device based on the first identification information and on second identification information of the device as further identified in the generated image.

Thus, for example, by identifying an interventional or treatment device both in an X-ray image and in a cross-section image generated from ultrasound image data that had been co-registered with the X-ray image data, a 3D localization of the device, i.e. its position and orientation in 3D space, can be established with relatively high accuracy and limited effort.

In certain examples, the 2D image data and/or 3D image data may comprise a sequence of 2D respectively 3D medical images being acquired in (quasi) real-time during a medical procedure. Thus, by continuously identifying the device in these image sequences, a 3D location can be continuously established and updated. In other words, accurate image-based tracking information representing the 3D device position and orientation becomes available in (quasi) real-time.

In certain examples, the processing unit is further configured to enhance the second image data by a representation of the device, based on the determined 3D position and orientation of the device.

Thus, a view generated or rendered from the ultrasound image data may be enhanced by a model of the interventional or treatment device of interest, which is overlaid in the view at the correct position and angle. It may be advantageous to present detailed information of an interventional or treatment device in the ultrasound image, as this may help to improve understanding of the ultrasound image and its interpretation. Thus, guidance for an intervention or treatment based on such image data may be enhanced, facilitating easier, faster and safer treatment.

For example, a 3D model of the device may be provided, and the overlay includes a virtual projection of the 3D model. For instance, a projection angle of the virtual projection may correspond to the orientation of the device in relation to the plane of the ultrasound view being enhanced.

The 3D model may, for example, be obtained from a database, or it may be acquired using a C-arm imaging system in a 3D rotational acquisition (CBCT scan). Alternatively, the model may be derived straight from 2D X-ray image data, assuming rotational symmetry of a device identified therein.

Accordingly, device information from the first image data may be used to augment the 3D ultrasound image data, which may help to improve understanding and interpretation of the ultrasound image by a physician and may contribute to improvement of ultrasound image quality.

In certain examples, the processing unit is further configured to generate a view from the second image data based on the determined 3D position and/or orientation of the device.

Thus, selected views from the second image data may be generated, rendered or reconstructed. Using the determined 3D device information, suitable views, such as multiplanar reformation (MPR) views for complex echo-guided procedures, can be rendered automatically. That is, the viewing direction of such generated views may be determined by the 3D device information.

Optionally, the generated ultrasound view may be enhanced by a representation of the device of interest as set out in the above.

The rendered views may be outputted to a display device for providing improved guidance to a user, for example a physician carrying out a cardiac interventional procedure.

Alternatively or in addition, for example, the generated image having the cross-section of the device may be presented together with a user interface enabling a user to manually select the further device points therein.

According to a further aspect, an imaging system is provided comprising an apparatus as described in the above and an imaging apparatus. The input unit is connectable with the imaging apparatus for receiving the first or second image data being acquired. For instance, the input unit is further connectable with a different imaging system for receiving the other of the first and second image data.

In an example, the imaging system is an ultrasound imaging system comprising an ultrasound probe for acquiring the second image data. More in particular, the ultrasound probe may be a 3D TEE, 3D TTE or 3D ICE probe. In this case, for example, the device identification involves ultrasound image data acquired using said ultrasound probe and X-ray image data received from an external X-ray imaging system.

In an alternative example, the imaging system is an interventional X-ray system comprising a C-arm imaging apparatus for acquiring the first image data. In this case, for example, the device identification involves X-ray image data acquired using said C-arm apparatus and ultrasound image data received from an external ultrasound imaging system.

It may also be foreseen that the imaging system is a combined X-ray and ultrasound imaging system comprising both a C-arm imaging apparatus and an ultrasound probe. Thus, both the first and second image data may be acquired on the same imaging system.

In a further aspect, a method for tracking a device in medical image data is provided comprising the steps of:
 a) acquiring first and second image data using different imaging apparatus, wherein the first and second image data include at least a portion of said device;
 b) establishing a co registration between the first and second image data;
 c) identifying a device in the first image data;
 d) determining identification information of the device;
 e) generating an image from the second imaging data based on the identification information, and
 f) further identifying the device in the generated image.

In certain examples, the steps of the method are repeated. Thus, using a sequence of first and second images being acquired, the device can be identified and localized in (quasi) real-time, enabling an accurate image-based tracking of the device for example inside the body of a patient.

According to a further aspect, a computer program product is provided comprising a set of instructions which, when executed by a processing unit of an apparatus as described in the above, cause the apparatus to carry out the above method. The computer program product may be stored or distributed on a suitable medium, such as an optical storage medium or a solid-state medium supplied together with or as part of other hardware, but it may also be distributed in other forms, such as via the Internet or other wired or wireless telecommunication systems.

These and other aspects of the present invention will become apparent from and be elucidated with reference to the embodiments described hereinafter.

BRIEF DESCRIPTION OF THE DRAWINGS

Exemplary embodiments of the invention will be described in the following with reference to the following drawings.

DETAILED DESCRIPTION OF EMBODIMENTS

Figure 1:
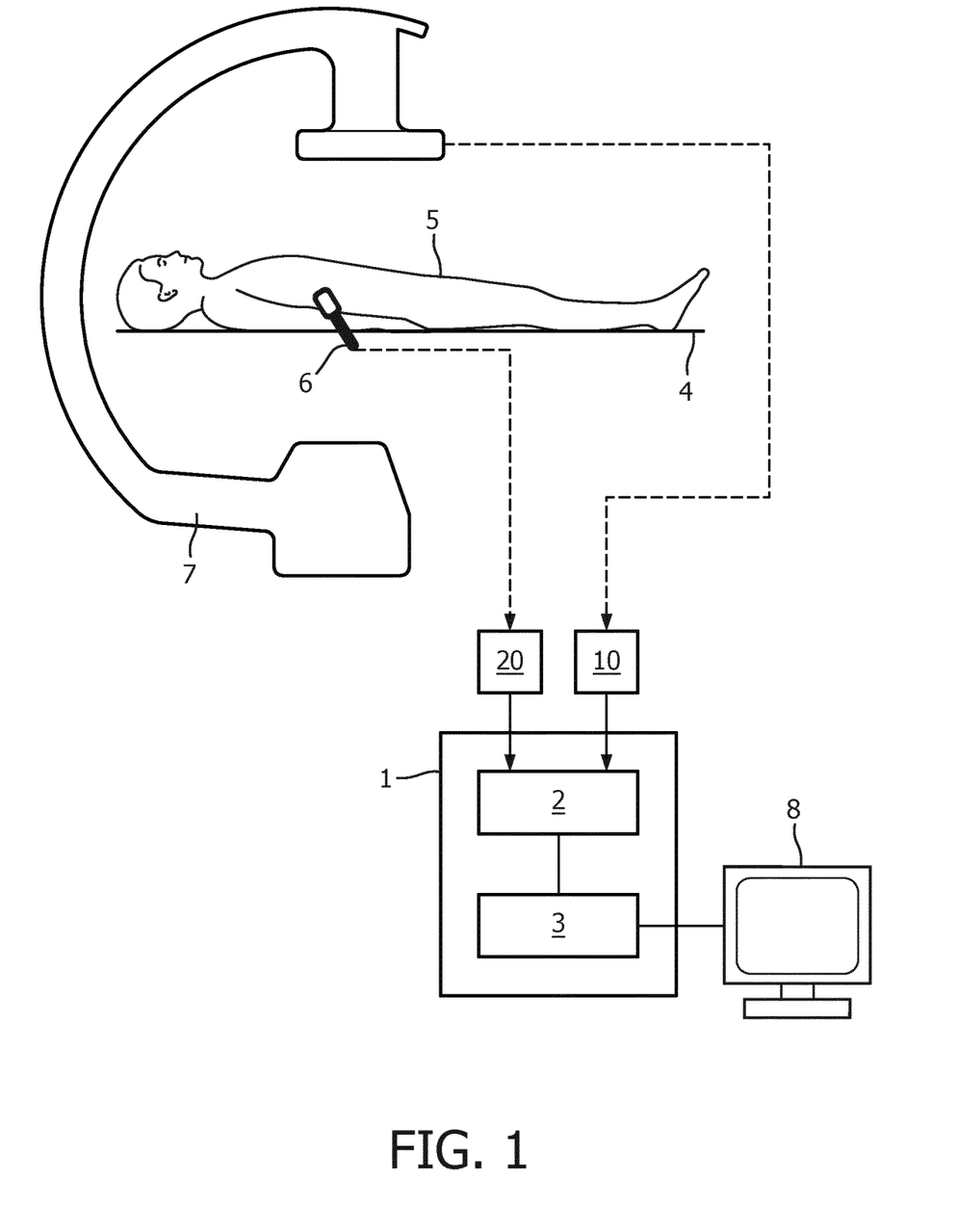
FIG. 1 shows an exemplary apparatus for supporting a medical procedure.

FIG. 1 shows an exemplary apparatus 1 for supporting a medical procedure as described herein. The apparatus comprises an input unit 2 for receiving first and second image data, for example X-ray medical image data from a C-arm imaging device 7 and ultrasound medical image data from an ultrasound probe 6. The image data are being acquired during a procedure being carried out on patient 5 lying on support 4. A processing unit 3 is provided for processing the image data and identifying a device of interest, in accordance with the examples further described herein.

Optionally, the apparatus is part of an imaging system, for example an ultrasound imaging system further comprising an ultrasound probe 6. In this case, for example, the apparatus may be configured as, or form part of, an ultrasound console. Alternatively, a computer program product may be provided to be executed by a processing unit of an ultrasound console.

Alternatively, the apparatus may be part of a C-arm interventional X-ray imaging system further comprising a C-arm imaging device 7. In this case, for example, the apparatus may form part of an interventional workstation. Alternatively, a computer program product may be provided to be executed by a processing unit of an interventional workstation.

In an example, the processing unit 3 may provide generated images or views, such as ultrasound or X-ray images that are optionally enhanced with model representations of a device of interest, to a display device 8. The displayed images may provide guidance to a physician during a medical procedure or intervention.

Figure 2:
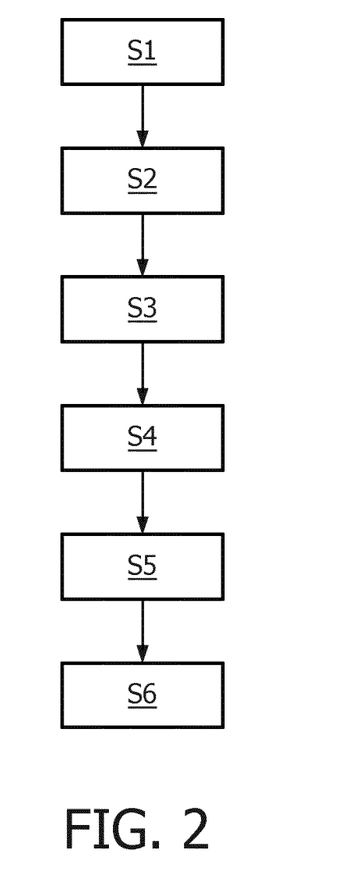
FIG. 2 shows an exemplary method for identifying a device in medical image data.

FIG. 2 shows an exemplary method for identifying a device in medical image data.

In step S1, first and second image data are acquired using different imaging apparatus, wherein the first and second image data include at least a portion of the device of interest.

In step S2, a co registration between the first and second image data may be established.

In step S3, the device of interest is identified in the first image data.

In step S4, identification information of the device of interest is determined, in which data resulting from the identifying step S3 may be used.

In step S5, an image is generated from the second imaging data based on the identification information determined in step S4.

In step S6, the device of interest is further identified in the image generated in step S5.

In an embodiment, after step S6, the method reverts to step S1 and the method steps are repeated over the duration of at least part of a medical procedure. Thus, sequences of first and second images are acquired, in which the device can be identified and localized in (quasi) real-time. Thereby, image-based tracking of the device location during at least the part of the medical procedure becomes feasible.

The method may be a computer-implemented method, wherein one or more of the steps are implemented as program code or instructions to be executed on a processing unit of a computer, such as processing unit 3 of the apparatus 1.

Figure 3:
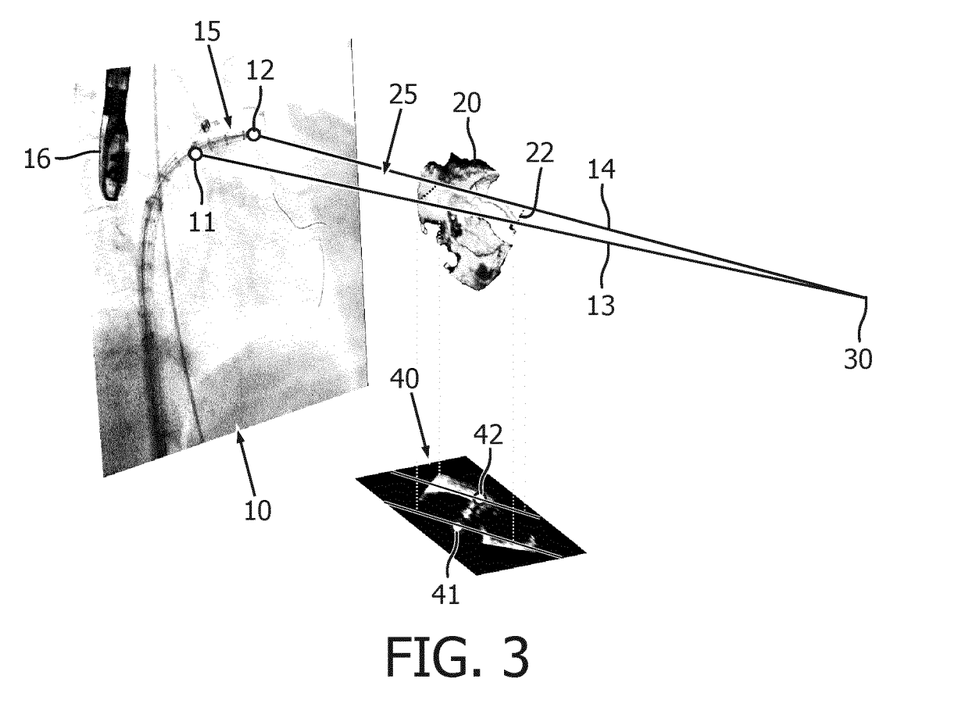
FIG. 3 shows an example of identification of a device in 3D space in more detail.

With reference to FIG. 3, examples of identifying a device of interest in 3D space in an apparatus and/or method as described herein are illustrated in more detail.

A device used during a medical intervention or procedure is present in the field of view (FoV) of first image data, here an X-ray fluoroscopy image 10 as may be acquired using a C-arm imaging apparatus, and in the field of view of second image data, here ultrasound image data 20 as may be acquired using a 3D TEE ultrasound apparatus. Alternatively, different ultrasound transducers such as 3D TTE or 3D ICE may be used in the acquisition.

Whereas a device footprint 15 having a high spatial resolution is visible in the X-ray image 10, ultrasound image data 20 mainly depicts the soft-tissue anatomy.

The coordinate system of the X-ray image 10 may be correlated to the coordinate system of the ultrasound image data 20 by establishing a co-registration between the two imaging modalities.

For example, the co-registration is established using the Philips EchoNavigator tool providing real-time fusion of live X-ray and 3D ultrasound images. Thus, a footprint 16 of the ultrasound transducer, here a 3D TEE probe, is detected in the X-ray image 10. The detected footprint 16 may be registered to a 3D model of the probe using a 2D-3D registration, in which different virtual projections, e.g. digitally rendered radiographs (DRR), of the 3D model are matched with the detected footprint. A position and orientation of the probe with respect to the X-ray image may then be estimated based on the matching, and thereby the correlation between the X-ray and ultrasound coordinate systems is determined.

In other words, a projection ray through a point in the X-ray image is now correlated to an epipolar line in the 3D space of the ultrasound image data.

In an example, the device is identified in the X-ray image by selecting two points 11, 12 on or adjacent to the device footprint 15. Thus, first identification information of the device of interest is established comprising information regarding the selected points, such as their image coordinates or location in the X-ray image 10.

The selection may be a manual selection carried out by an operator, e.g. an echo cardiographer, viewing the X-ray image 10 on a monitor or touch screen device. For example, the points may be selected by means of mouse clicks in the image, or alternatively by a touch interactions such as touching two points or dragging an arrow from a first point to a second point.

Alternatively or in addition, the device 15 can be automatically identified in the X-ray image using computer vision image processing techniques. For example, the tip of certain devices may readily be detected, defining an end point of the device. Alternatively or in addition, a known shape of certain devices may be automatically segmented in the X-ray image, thereby defining both a start point and an end point of the device. In certain examples, such image processing may be carried out using deep-learning techniques, using a convolutional neural network (CNN) trained to recognize certain device features or shapes from X-ray images. These techniques generally result in device identification information comprising X-ray image coordinates or locations that are indicative of the position of the device in the image.

In an example, epipolar lines or projection lines 13, 14 in 3D space correspond to rays originating from a point of origin of the X-rays and passing through two selected or identified points 11, 12. The X-ray point of origin corresponds to a focus point or focal spot 30 of an X-ray tube used to generate the X-rays. The two projection lines 13, 14 define a plane 25, in other words, plane 25 is defined based on the device identification information. In a further example, a device centerline may be automatically identified from the X-ray image, and plane 25 may be defined by the focal spot 30 and the identified device centerline.

The plane 25 may be defined in the 3D space of the ultrasound image data 20 as the coordinate systems of X-ray and ultrasound image data had been correlated. An intersection or cross-section plane 22 through the 3D ultrasound image data 20 is likewise indicated.

Assuming the device of interest is in the field of view of the ultrasound image data 20, plane 22 includes a cross-section of the device. Thus, for identifying the device in the ultrasound image data 20 and determining corresponding second device identification information, a cross-section image 40 including at least a portion of the device, for example an MPR view, may be generated.

In an example, a further identification of the device may include a selection, in the generated image, of two further points 41, 42 defining the device. In that case, the second identification information may comprise image coordinates of the selected further points 41, 42 in the ultrasound image data. The selection may be a manual selection carried out by an operator, e.g. an echo cardiographer, viewing the generated image 40 on a monitor or touch screen device. Alternatively or in addition, the further identification of the device may be done automatically in a similar manner as the automatic identification in X-ray images as described above.

Figure 4:
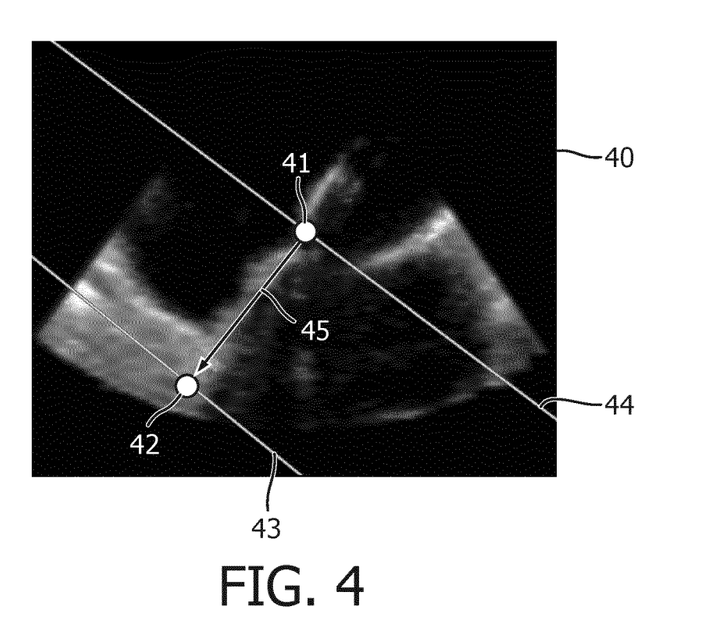
FIG. 4 shows, in more detail, an exemplary ultrasound MPR view for further identification of the device.

FIG. 4 shows an exemplary ultrasound MPR view as the generated image 40 for further identification of the device, in more detail.

In the view, epipolar lines 43, 44 corresponding to the X-ray projection lines 13, 14 may be visualized for the user. A selection of points 41, 42 may be constrained to the epipolar lines 43, 44. In other words, a boundary condition is set on the point selection that either point 41, 42 must lay on, or within a distance threshold from, a corresponding line 43, 44. This constraint may simplify the selection step, as the device may be difficult to discern in an ultrasound image.

For example, the selection may be a manual selection carried out by an operator by means of mouse clicks in the generated image 40, or alternatively by touch interactions, such as touching the two points 41,42 directly or dragging a line or arrow 45 between two points on the epipolar lines 43, 44 in a direction parallel thereto.

Alternatively, one or more points of the device could be automatically detected in the generated image using computer vision image processing techniques, which task may be facilitated by restricting a search space for the points to a limited area adjacent to the epipolar lines 43, 44.

After the device has been identified in the generated image, for example once the further points 41, 42 have been placed on the echo cross-section image 40, a position and orientation of the device in 3D space may be determined.

It is noted that, although the above examples generally assume that flat image planes are used, it is likewise possible to rely on curved planes for example by selecting more than two points, or by drawing or fitting a curve corresponding to a shape of a device footprint, in the X-ray image 10 and generating a curved planar reformation (CPR) view from the 3D ultrasound imaging data as the image 40 in which the device is further identified. In this case, the cross-section image 22 would correspond to a curved plane in 3D space.

The determined 3D device information may be used for example for setting up specific views from the ultrasound image data. For example, MPR views may be generated having viewing planes that are aligned with the 3D orientation of the device. In addition, anatomical information may be used in setting up such views and determining the viewing direction.

In an example, using a model-based segmentation algorithm to automatically identify certain soft-tissue anatomical features from 3D ultrasound image, anatomical context information may be available that may be combined with the 3D device information to present optimal echo views to a physician during certain steps of a medical intervention or procedure.

In certain examples, if the device is automatically identified in a sequence of X-ray images and/or generated ultrasound views preferably generated in (quasi) real-time during a medical procedure, the device may be continuously tracked in the image data and thus (quasi) real-time 3D device information may be determined. Accordingly, the generated views can be updated continuously, providing a physician with automatic optimal echo views on the device even when a device is being moved or manipulated inside the patient.

In addition or alternatively, the determined 3D device information may be used for example for augmenting a view generated from the 3D ultrasound image data with a detailed representation of the device, such as a projection of a 3D device model. In a further example, dedicated image processing may be applied to such view at the 3D location of the device, for example, colorization, shading, contrast enhancement, background reduction, and so forth.

Automatic device visualization in combination with optimal anatomy views in accordance with the above examples may facilitate easier, faster and safer treatment, for example in the field of complex transcatheter procedures like Transcatheter Mitral Valve Repair (TMVR) and Transcatheter Tricuspid Valve Repair (TTVR).

Figure 5:
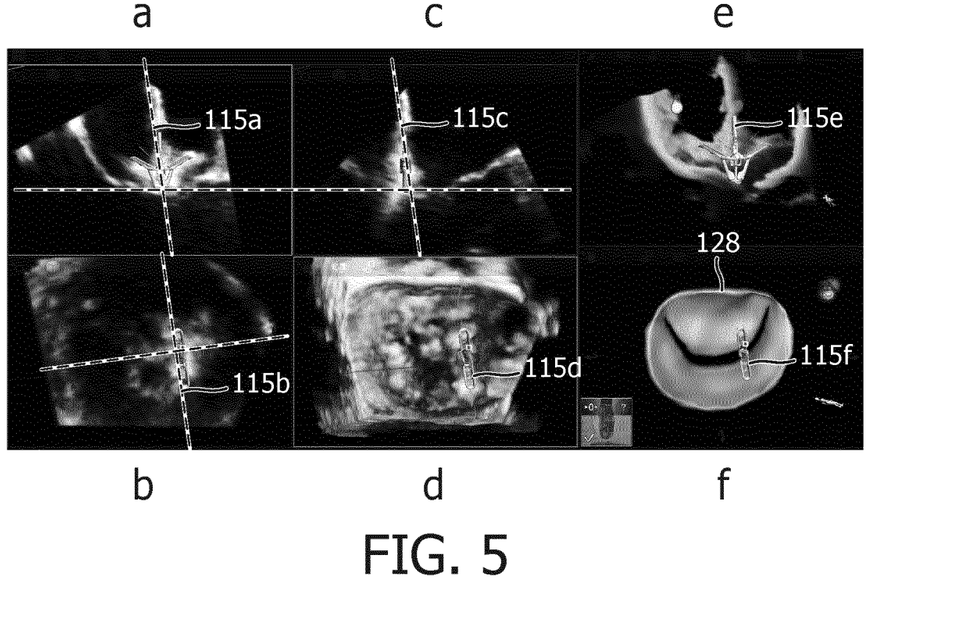
FIG. 5 shows different exemplary ultrasound views acquired during a TMVR procedure.

In an example illustrated in FIG. 5, a MitraClip® treatment device by Abbott is implanted on the mitral valve through a catheter in a TMVR procedure aiming to reduce mitral regurgitation (MR). The device treats mitral regurgitation by clipping together a small area of the valve.

FIG. 5 shows different views from ultrasound image data that may be obtained during such procedure, for example when using a Philips EPIQ CVx ultrasound imaging system for providing image guidance during the device placement. The generated views are based on, and incorporate, 3D information of the identified device.

More in particular, views a), b) and c) correspond to MPR views generated from the ultrasound image data. In particular, the three views are orthogonal views aligned with the treatment device. In each of the MPR views, the image planes of the other two orthogonal views have been indicated as dotted lines.

Representations 115a, 115b, 115c of the device have been included as an overlay. Thus, although the treatment device itself is difficult to discern in echo views during the procedure, the physician carrying out the procedure is presented with a clear view on the position and orientation of the device being implanted.

Further, views d) and e) correspond to views b) and a) respectively as to viewing angle, however instead of MPR view, a conventional 3D ultrasound volume rendering (view d) and a photorealistic rendering (view e), such as a Philips TrueView ultrasound image with user-movable light source, are shown providing a physician with more anatomical context. In both echo views, representations 115d, 115e of the device being implanted are likewise overlaid.

Finally, view f) corresponds to views b) and d) as to viewing angle. However, compared to view d), a more focused anatomical context has been provided. Namely, a 3D model 128 of the mitral valve is shown, which had been adapted to the ultrasound image data using a model-based segmentation algorithm. Thus, a clear overview is provided showing the 3D position and orientation of the device as represented by representation 115f with respect to the leaves of the mitral valve as represented by the adapted 3D model 128.

Figure 6:
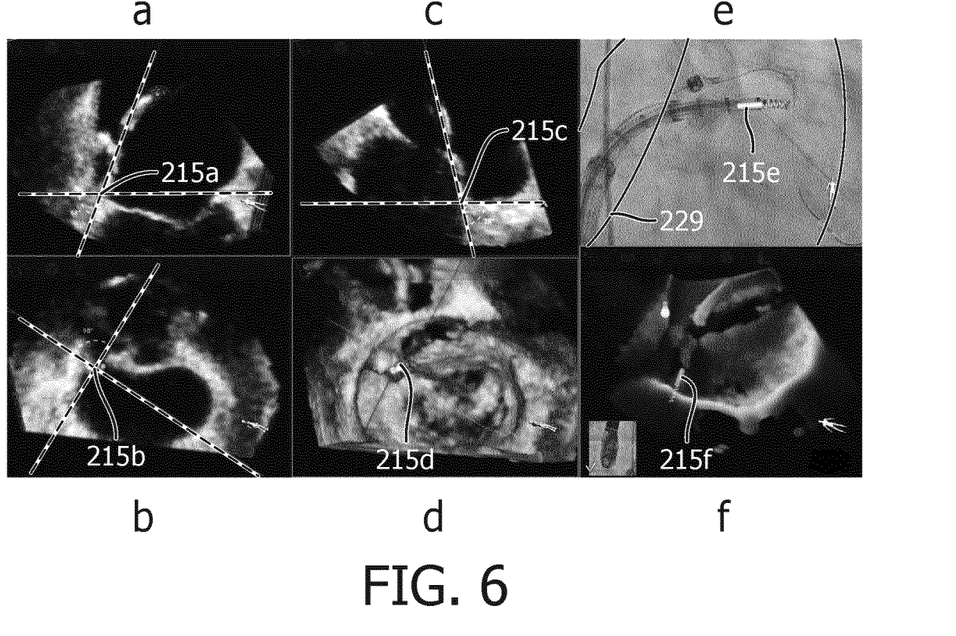
FIG. 6 shows different exemplary ultrasound views acquired during a TTVR procedure.

In a further example, FIG. 6 illustrates a TTVR procedure in which a CardioBand™ by Edwards Lifesciences is placed in order to reconstruct the tricuspid or mitral valve. The CardioBand system includes stainless-steel anchors that are used to fasten the implant to the annulus, for example in an image-guided procedure using ultrasound images.

FIG. 6 shows different views from ultrasound image data that may be obtained during such procedure. The generated views are based on, and incorporate, 3D information of an identified device. In this example, the device of interest is a fastening anchor for the Cardioband implant.

More in particular, views a), b) and c) correspond to MPR views generated from the ultrasound image data. In particular, the three views are orthogonal views aligned with the anchor device. Representations 215a, 215b, 215c of the device have been included as an overlay. In this example, also anatomical context information has been used in setting up the views. Namely, the view directions are selected such that optimal views for this procedure are obtained, crossing the center of the valve and being perpendicular to the annulus/landing zone. Again, the anatomical context information may be obtained by means of a model-based segmentation algorithm adapting a valve model to the ultrasound image data.

Further, views d) and f) again provide a conventional 3D volume rendering and photorealistic 3D rendering, respectively.

Finally, view e) shows an enhanced X-ray image in which a representation 215e of the anchor device is likewise presented as an overlay.

For reference, a contour 229 of a field of view of the co-registered ultrasound image data, from which the other views are generated, is also indicated. For example, when it is detected that the identified device 15 identified in the X-ray image may lie partly outside the contour 229 i.e. that the device may not fully reside within the ultrasound field of view, a warning may be generated to indicate that a further identification of the device in the generated ultrasound view may not be feasible or sufficiently accurate.

It is noted with respect to FIGS. 5 and 6 that in practice the displayed views may be dynamic views, wherein the generated views are continuously updated, or periodically updated following any device movement, using device tracking information derived from the images i.e. the updated 3D position and orientation information. For example, method steps S1 through S6 may be repeated resulting in a device tracking method whereby one or both of the identifying steps may include an automatic device identification using computer vision techniques. It may also be envisaged that an initial device identification carried out manually is combined with automatic device identification during further tracking, or that a periodic manual (re) identification of the device during an otherwise automatic tracking process may be beneficial.

In device tracking embodiments, following each instance of step S6, a current 3D device position and orientation may be determined and used, for instance in generating ultrasound views at updated viewing angles and/or an updated device overlay in accordance with to the new 3D device position and orientation. Thus, views that optimally support an ongoing procedure may be generated in (quasi) real-time.

It has to be noted that certain examples are described with reference to different aspects. In particular, some examples are described with reference to method type claims whereas other examples are described with reference to the apparatus type claims. However, a person skilled in the art will gather from the above and the following description that, unless otherwise notified, in addition to any combination of features belonging to one type of subject matter also any combination between features relating to different aspects is considered to be disclosed with this application.

While the invention has been illustrated, and described in detail in the drawings and foregoing description, such illustration and description are to be considered illustrative or exemplary and not restrictive. The invention is not limited to the disclosed embodiments. Other variations to the disclosed embodiments can be understood and effected by those skilled in the art in practicing a claimed invention, from a study of the drawings, the disclosure, and the dependent claims.

In the claims, the word "comprising" does not exclude other elements or steps, and the indefinite article "a" or "an" does not exclude a plurality. A single processor or other unit may fulfil the functions of several items re-cited in the claims. The mere fact that certain measures are recited in mutually different dependent claims does not indicate that a combination of these measures cannot be used to advantage. Any reference signs in the claims should not be construed as limiting the scope.

The invention claimed is:

1. An apparatus for tracking a device during a medical procedure, the apparatus comprising:
    a processor in communication with memory, the processor configured to:
        receive first image data and second image data that each include at least a portion of the device, wherein the first image data and the second image data are acquired using different imaging apparatus, and wherein the second image data is three-dimensional (3D) image data;
        establish a co-registration between the first image data and the second image data;
        identify the device in the first image data;
        determine first identification information of the identified device in the first image data by selecting as the first identification information two points defining the device in the first image data;
        identify 3D position and 3D orientation of the device in the second image data based on the first identification information and the co-registration, comprising (i) obtaining two projection lines passing through the selected two points, the two projection lines deriving an image plane of a cross-section of the identified device in the second image data and (ii) identifying the 3D position and the 3D orientation of the device in the second image data using the derived image plane; and
        generating an image by enhancing the second image data with a model representation of the device based on the identified 3D position and the identified 3D orientation.

2. The apparatus of claim 1, wherein the first image data comprises two-dimensional (2D) X-ray image data and the second image data comprises 3D ultrasound image data.

3. The apparatus of claim 1, wherein a further identification of the device in the generated image includes a selection, in the generated image, of two further points defining the device.

4. The apparatus of claim 3, wherein the two further points lie on epipolar lines in the generated image.

5. The apparatus of claim 1, wherein the processor is further configured to generate device tracking information, including the 3D position of the device and the 3D orientation of the device, based on the first identification information and on second identification information of the device as further identified in the generated image.

6. The apparatus of claim 1, wherein the model representation of the device comprises a virtual projection of a 3D model of the device.

7. The apparatus of claim 1, wherein the processor is further configured to generate a view from the second image data based on at least one of the 3D position of the device or the 3D orientation of the device.

8. The apparatus of claim 1, wherein processor is further configured to: generate the image to comprise a view aligned with the identified 3D position and the identified 3D orientation of the device in the second image data.

9. An imaging system comprising:
    an imaging apparatus configured to acquire the first image data or the second image data, and
    the apparatus according to claim 1, wherein the processor is connectable with the imaging apparatus for receiving the first image data or the second image data.

10. A method for tracking a device in medical image data, the method comprising:
    acquiring first image data and second image data using different imaging apparatus, wherein the first image data and the second image data each include at least a portion of the device, and wherein the second image data is three-dimensional (3D) image data;
    establishing a co-registration between the first image data and the second image data;
    identifying the device in the first image data;
    determining first identification information of the device in the first image data by selecting as the first identification information two points defining the device in the first image data;
    identifying 3D position and 3D orientation of the device in the second image data based on the first identification information and the co-registration, comprising (i) obtaining two projection lines passing through the selected two points, the two projection lines deriving an image plane of a cross-section of the identified device in the second image data and (ii) identifying the 3D position and the 3D orientation of the device in the second image data using the derived image plane; and
    generating an image by enhancing the second image data with a model representation of the device based on the identified 3D position and the 3D orientation.

11. The method of claim 10, further comprising generating device tracking information, including the 3D position of the device and the 3D orientation of the device, based on the first identification information and on second identification information of the device as further identified in the generated image.

12. The method of claim 10 further comprising generating a view from the second image data based on at least one of the 3D position or the 3D orientation.

13. The method of claim 10, wherein generating the image comprises generating the image to comprise a view aligned with the identified 3D position and the identified 3D orientation of the device in the second image data.

14. A non-transitory computer-readable storage medium having stored a computer program comprising instructions which, when executed by a processor, causes the processor to:
receive first image data and second image data that each include at least a portion of a device, wherein the first image data and the second image data are acquired using different imaging apparatus, wherein the second image data is three-dimensional (3D) image data;
establish a co-registration between the first image data and the second image data;
identify the device in the first image data;
determine first identification information of the device in the first image data by selecting as the first identification information two points defining the device in the first image data;
identify 3D position and 3D orientation of the device in the second image data based on the first identification information and the co-registration, comprising (i) obtaining two projection lines passing through the selected two points, the two projection lines deriving an image plane of a cross-section of the identified device in the second image data and (ii) identifying the 3D position and the 3D orientation of the device in the second image data using the derived image plane; and
generating an image by enhancing the second image data with a model representation of the device based on the identified 3D position and the identified 3D orientation.

15. The non-transitory computer-readable storage medium of claim 14, wherein the instruction, when executed by the processor, further cause the processor to generate device tracking information, including the 3D position of the device and the 3D orientation of the device, based on the first identification information and on second identification information of the device as further identified in the generated image.

16. The non-transitory computer-readable storage medium of claim 14, wherein the model representation of the device comprises a virtual projection of a 3D model of the device.

17. The non-transitory computer-readable storage medium of claim 14, wherein the instruction, when executed by the processor, further cause the processor to generate a view from the second image data based on at least one of the 3D position or the 3D orientation.

18. The non-transitory computer-readable storage medium of claim 14, wherein, to generate the image, the instruction, when executed by the processor, further cause the processor to generate the image to comprise a view aligned with the identified 3D position and the identified 3D orientation of the device in the second image data.

* * * * *